United States Patent

Freund et al.

[11] Patent Number: 6,099,818
[45] Date of Patent: Aug. 8, 2000

[54] CARBON BLACKS AND PROCESS FOR PRODUCING THEM

[75] Inventors: Burkhard Freund, Erfstadt; Gerhard Kühner, Hanau; Ulrich Sattler, Erfstadt; Karl Vogel, Alzenau, all of Germany

[73] Assignee: Degussa-Hüls Aktiengesellschaft, Frankfurt, Germany

[21] Appl. No.: 09/168,325

[22] Filed: Sep. 25, 1998

Related U.S. Application Data

[63] Continuation-in-part of application No. 08/665,632, Jul. 18, 1996, abandoned.

[30] Foreign Application Priority Data

Jun. 19, 1995 [DE] Germany .......................... 195 21 565

[51] Int. Cl.⁷ .............................. C01D 3/00; B60C 1/00; B60C 5/00; B60C 9/00; C08J 3/40
[52] U.S. Cl. ..................... 423/449.1; 152/525; 152/450; 152/451; 152/564; 524/495
[58] Field of Search .................... 152/525, 450, 152/451, 564; 524/495; 423/449.1

[56] References Cited

U.S. PATENT DOCUMENTS 5,179,154  1/1993  Muraki et al. .......................... 524/496
5,484,836  1/1996  Kikuchi et al. .......................... 524/495

FOREIGN PATENT DOCUMENTS

3426864 A1  1/1985  Germany .
WO 94/21720  1/1994  WIPO .

OTHER PUBLICATIONS

Japanese Abstract XP002061698 (JP 07082421A), Database WPI, Week 9521, Mar. 28, 1995.

Primary Examiner—Steven P. Griffin
Assistant Examiner—Jonas N. Strickland
Attorney, Agent, or Firm—Smith Gambrell & Russell, LLP

[57] ABSTRACT

Disclosed are improved carbon blacks and a process for producing them. The improved carbon blacks are distinguished from conventional blacks having the same CTAB surface, after incorporation into SSBR/BR rubber compositions, by a lower rolling resistance with equal or better wet skid behavior. They can be produced in conventional carbon black reactors by conducting the burning in the combustion chamber so that carbon nuclei form and are immediately brought into contact with the carbon black raw material.

19 Claims, 7 Drawing Sheets

(1 of 7 Drawing Sheet(s) Filed in Color)

FIG. 1

STM - Analysis: N 220

Figure 6a

STM - Analysis: EB 111

Figure 6b

ASTM GRADE

FIG. 7A

INVERSION BLACK

FIG. 7B

FIG. 8

CARBON BLACKS AND PROCESS FOR PRODUCING THEM

REFERENCE TO A RELATED APPLICATION

This is an continuation-in-part of our application Ser. No. 08/665,632 filed Jul. 18, 1996, now abandoned, which is relied on and incorporated herein by reference.

INTRODUCTION AND BACKGROUND

The present invention relates to improved carbon blacks and a process for producing them.

Carbon blacks are used extensively as reinforcing blacks in rubber mixtures for the tire industry. The characteristics of the carbon black, combined with the properties of the rubber compositions used, influence the performance properties of the finished tires.

Requirements for the properties of the rubber compositions of the tires include high resistance to abrasion, the lowest possible rolling resistance, and the best possible wet skid behavior. Both of the latter properties are significantly affected by the viscoelastic behavior of the tread composition. For periodic deformation, the viscoelastic behavior can be described by the mechanical loss factor tan $\delta$ and, in the case of stretching or compression, by the dynamic modulus of extension $|E^*|$. Both quantities depend strongly on the temperature. The wet skid behavior of the tread composition is generally correlated with the loss factor at about 0° C., tan $\delta_0$, while the rolling resistance is correlated with the loss factor at about 60° C., tan $\delta_{60}$. The higher the loss factor at the low temperature, the better, generally, is the wet skid behavior of the tire composition. On the other hand, the lowest possible loss factor at the higher temperature is required to reduce the rolling resistance.

The abrasion resistance and the viscoelastic properties, and thus also the loss factor of the tread mixture, are significantly determined by the properties of the reinforcing black used in the rubber formulation for the tire. The important factor here is the specific surface area, and particularly the CTAB (cetyltrimethylammonium bromide) specific surface area which is a measure of the portion of the carbon black surface that is effective in rubber. The abrasion resistance and tan $\delta$ increase with increasing CTAB surface area. The CTAB designation is well known in this industry. The DBP (dibutyl phthalate) absorption and the 24M4 DBP absorption are other important carbon black properties of the initial structure or the residual structure following mechanical loading of the black. The DBP and 24M4 DBP designations are well understood in this field of technology.

Carbon blacks having CTAB surfaces between 20 and 190 $m^2/g$ and 24M4 absorption numbers between 60 and 140 ml/100 g are suitable for tire rubber compositions.

The mean particle size is used to classify the carbon black according to ASTM (American Society for Testing and Materials) D-1765. This involves a four-character alphanumeric nomenclature, in which the first letter (either N or S) makes a statement about the vulcanization properties, and the first digit of the following three-digit number indicates the mean particle size. This ASTM classification is admittedly quite coarse. There can be substantial variation of the viscoelastic properties of tread mixtures within a single ASTM classification range.

It has been shown that ordinary carbon black cannot affect the temperature dependence of the loss factor, tan $\delta$, enough so that the tread mixture will have a lower rolling resistance with equal or better wet skid behavior. The desired reduction of the rolling resistance is generally directly coupled with deterioration of the wet skid behavior. Carbon blacks which produce a low rolling resistance are called "low hysteresis" blacks.

Thus, it is desirable to use carbon blacks which, after incorporation into a rubber composition, give that rubber composition a low value of tan $\delta_{60}$ with an equal or greater value of tan $\delta_0$, with equal or comparable analytical properties for the carbon black, especially equal CTAB surface. The ratio of the two values, tan $\delta_0$/tan $\delta_{60}$ should be greater than for ordinary carbon blacks with the same CTAB surface.

DE 43 08 488 corresponding to U.S. Pat. No. 5,639,817 discloses carbon-black-reinforced rubber compositions which are supposed to have a "steeper" tan $\delta$/temperature curve. This statement refers to the comparison of two rubber mixtures, the first made with a carbon black according to the invention of DE 43 08 488 and the second made using a standard carbon black N339. However, the standard N339 carbon black has twice as great a CTAB surface, at 91 $m^2/g$, as the carbon black according to DE 43 08 488. The carbon black according to DE 43 08 488 thus gives the tread composition a much lower abrasion resistance, so that it cannot be considered for use in the tread composition. On the other hand, when a standard carbon black with the same CTAB surface as the carbon black according to DE 43 08 488 is used, a steeper temperature curve can be observed. Therefore the problem above is not solved with the rubber composition disclosed in DE 43 08 488.

Kikuchi et al. U.S. Pat. No. 5,484,836 discloses rubber compositions for tires said to be low fuel consumption tires with improved heat build up and wear resistance. The carbon black used therein is disclosed to have a CTAB of 85 to 110 $m^2/g$ based on ASTM D 3765-80 and a CDBP of greater than 105 ml/100 g. However, Kikuchi gives only relative values for tan $\delta$ with no absolute values.

Muraki discloses rubber compositions for tires which are intended for use with sophisticated sports cars. Here, driving stability is of prime importance at 0° C. and also 60° C. Therefore, Muraki tries to increase both tan $\delta$-values at 0° C. and at 60° C. Our aim is to decrease tan $\delta_{60}$ and to increase tan $\delta_0$ at the same time (which is called the inversion effect). The aim of Muraki is to give rubber compositions for sports or racing cars with excellent gripping force on wet and dry road. Since fuel consumption is of no concern, Muraki's compositions have a high rolling resistance. Contrary to that, one of the objects of the invention is to reduce rolling resistance while at the same time retain good wet grip. Therefore, tan $\delta_{60}$ must be reduced and tan $\delta_0$ increased or at least kept constant.

The WO 94/21720 claims a rubber composition containing a special carbon black which exhibits a steeper tan $\delta$ temperature curve than when ordinary tire-tread carbon black is used.

To prove this allegation the applicant M. M. M. compares two rubber compositions: one containing their special carbon black Ensaco 150 and a conventional ASTM carbon black N339. In table 2 of WO 94/21720 the properties of both carbon blacks are listed.

The CTAB surface area of Ensaco 150 is 45 $m^2/g$ and of N339 is 91 $m^2/g$. As explained earlier, the CTAB surface area is well known to be the most important parameter of carbon black with respect to the dynamic properties of the final rubber composition. The abrasion resistance and tan $\delta$ increase with increasing CTAB surface area. Comparisons made herein, therefore, comparing the rubber compositions according to the invention on the basis of the same CTAB surface area (see FIG. 2 of our application).

WO 94/21720, however, compares rubber compositions with carbon black which differ in CTAB surface area by a factor of 2.

With respect to WO 94/21720, we obtained samples of Ensaco 150 and we investigated rubber compositions containing Ensaco 150. Although the test parameters do not coincide exactly with the parameters given in our application, the different parameters are not significant in view of the magnitude of difference in the calculated tan $\delta_0$/tan $\delta_{60}$ ratio, discussed below in more detail.

A rubber composition containing Ensaco 150 was formulated as follows:

| Rubber Component | Content (phr) |
| --- | --- |
| SBR 1712 | 137.5 |
| Ensaco 150 | 90 |
| ZnO RS | 3 |
| stearic acid | 1 |
| vulkanox 4010 NA | 1 |
| DPG | 0.5 |
| vulkacit NZ | 1.2 |
| sulfur | 1.8 |

The tan $\delta$-values measured were:

tan $\delta$=0.323 tan $\delta$=0.173 tan $\delta_0$/tan $\delta_{60}$=1.867

According to our invention this ratio should be larger than:

tan $\delta_0$/tan $\delta_{60}$ > 2.76 − 6.7 · $10^{-3}$ · CTAB
tan $\delta_0$/tan $\delta_{60}$ > 2.76 − 6.7 · $10^{-3}$ · 45
tan $\delta_0$/tan $\delta_{60}$ > 2.458

The Ensaco 150 carbon black fails by far to supply rubber compositions with a tan $\delta_0$/tan $\delta_{60}$-ratio larger than 2.458. Therefore, the Ensaco 150 carbon black is not an inversion black according to the present invention.

Carbon blacks for the tire industry are now produced almost exclusively by the carbon black process (see Kirk-Other's *Encyclopedia of Chemical Technology*, (Third Edition), Volume 4, pages 631–666; this excerpt is entirely incorporated herein by reference). This production is based on the principle of oxidative pyrolysis, i.e., incomplete combustion of raw materials in a reactor coated with material highly fire resistant. Three zones in the reactor can be distinguished independently of the particular design of the reactor. These correspond to the three different stages of carbon black production. The zones appear in succession along the axis of the reactor and the reacting media flow through them successively.

The first zone, the "combustion zone", is essentially the combustion chamber of the reactor. The hot combustion chamber exhaust gas is produced in this zone by burning a fuel, usually hydrocarbons, with an excess of preheated combustion air or other oxygen-containing gases. Natural gas is now used predominantly as the fuel but liquid hydrocarbons such as fuel oil can also be used. The fuel is usually burned with excess oxygen. According to the book *"Carbon Black"*, 2nd Edition, Marcel Dekker Inc., New York, 1993, page 20, the most complete possible conversion of the fuel to carbon dioxide and water in the combustion chamber is critical for optimal use of energy. The excess air promotes the complete conversion of the fuel. The fuel is usually introduced into the combustion chamber through one or more burner lances.

The "K factor" is often used as a measure to characterize the air excess. The K factor is the ratio of the volume of air needed for stoichiometric combustion of the fuel to the volume of air actually introduced for combustion. Thus a K factor of 1 indicates stoichiometric combustion. With an excess of air, the K factor is less than 1. K factors are usually between 0.3 and 0.95.

Carbon black is formed in the second zone in the furnace reactor, the "reaction zone". The carbon black yielding feedstock is injected into the stream of hot exhaust gas and mixed. The amount of hydrocarbon introduced into the reaction zone is in excess in relation to the amount of oxygen not completely consumed in the combustion zone. Therefore carbon black production normally occurs here.

Carbon black make oils of different types can be injected into the reactor. For example, it is suitable to use an axial oil injection lance or one or more radial oil lances arranged around the circumference of the reactor in a plane perpendicular to the direction of flow. A reactor can have several places with radial oil lances along the flow direction. At the heads of the oil lances there are either spray or atomizer nozzles which mix the make oil into the flow of exhaust gas.

When make oil and gaseous hydrocarbons such as methane are used simultaneously as the carbon black raw materials, the gaseous hydrocarbons can be injected into the stream of hot exhaust gas separately from the make oil through a separate set of gas lances.

In the third zone of the carbon black reactor, the "quench zone", the carbon black formation is terminated by rapid cooling of the process gas containing the carbon black. That avoids undesired later reactions. Such subsequent reactions would produce porous carbon blacks. The quenching is usually done by injecting water with suitable spray nozzles. Carbon black reactors usually have several places along the reactor where water is sprayed in for quenching, so that the residence time of the carbon black in the reaction zone can be varied. In a subsequent heat exchanger, the residual heat of the process gas is utilized to preheat the combustion air.

Many different reactor forms are known in the art. The variations described affect all three reactor zones. There are especially many designs for the reaction zone and for the arrangement of the injection lances for the carbon black raw material. They can be distributed around the circumference of the reactor or along the reactor axis. The make oil can be mixed into the exhaust gas from the hot combustion chamber better when it is divided into several separate streams. Input points distributed along the direction of flow allows staggering the oil injection with time.

The primary particle size and the specific surface of the carbon black, which is usually easy to determine, can be established by the quantity of make oil injected into the hot exhaust gas. If the volume and temperature of the exhaust gas generated in the combustion chamber are kept constant, then the quantity of make oil is solely responsible for the primary particle size and the specific surface of the carbon black. High proportions of make oil give coarser carbon blacks with lower specific surfaces than do lower proportions of make oil. The reaction temperature changes along with the change in proportion of make oil. As the make oil sprayed in reduces the temperature in the reaction, higher proportions of make oil mean lower temperatures, and vice versa. From that there follows the relation between the temperature of formation of carbon black and the specific surface of the carbon black, or the primary particle size, described on page 34 of the previously cited book, "*Carbon Black*".

If the make oil is divided between two different injection points spaced along the reactor axis, the residual oxygen in the exhaust gas from the combustion chamber is in excess in relation to the make oil injected at the first point upstream. Therefore, the carbon black is formed at a higher temperature there than at the subsequent injection sites. That is, more finely divided carbon black with higher specific surface forms at the first injection point than at the subsequent injection points.

Each subsequent injection of make oil causes a further decrease in temperature, producing black with larger primary particles. Thus, carbon blacks produced in this manner have a broader distribution curve for the primary particle and aggregate sizes, and behave differently after incorporation into rubber than do carbon blacks with a very narrow monomodal size distribution curve. The broader aggregate size distribution curve gives a lower loss factor in the rubber composition, i.e., lower hysteresis, so that one also speaks of low-hysteresis carbon blacks. Carbon blacks of this type, and. processes for producing them, are described in U.S. Pat. Nos. 4,988,493 and 5,124,396 (both of which are incorporated by reference in their entirety), corresponding to EP 0 315 443 and EP 0 519 988 respectively.

Thus, conventional processes are able to produce carbon blacks with broader aggregate size distribution curves by injecting the make oil at different points along the axis. When these carbon blacks are incorporated into rubber compositions they give lower rolling resistances.

SUMMARY OF THE INVENTION

An object of the present invention is to produce new types of carbon black which are different from the known carbon blacks in their characteristics for use in rubber. In particular, rubber compositions utilizing the new kind of carbon black are intended to be distinguished by reduced rolling resistance with the wet skid behavior at least equal to if not better compared to conventional carbon black products.

While the objective of conventional carbon black processes is the most complete possible combustion of the fuel in the combustion chamber or combustion zone, the process according to the present invention has as one of its objectives the formation of carbon nuclei by incomplete combustion of the fuel in the combustion zone. The carbon nuclei are carried in the stream of hot exhaust gas into the reaction zone, where they cause nucleated carbon black formation with the make oil introduced. The desired incomplete combustion of the fuel does not mean, though, that the fuel is burned with insufficient oxygen. Instead, the process according to the invention also begins with an excess of air or oxygen-containing gas in the combustion chamber. K factors between 0.3 and 0.95 are used, as for conventional carbon blacks. However, K factors between 0.6 and 0.7 are preferred.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The present invention will be further understood with reference to the drawings, wherein.

DETAILED DESCRIPTION OF THE INVENTION

There are various ways to generate carbon nuclei in spite of the excess of air or oxygen containing gas. In one preferred embodiment of the process according to the invention, heavy liquid hydrocarbons (highly aromatic and/ or long chained hydrocarbons) are used as fuel instead of natural gas. They are burned with an excess of air or oxygen-containing gas. Heavy liquid hydrocarbons burn more slowly than gaseous ones, as they must first be converted to the gaseous form (vaporized). Thus, carbon nuclei can be produced, aside from combustion, with liquid hydrocarbons in spite of the excess oxygen. If there is time enough and the temperature is high enough, they will burn; but they can grow to larger carbon black particles with rapid cooling. The nucleated carbon black formation is based on the fact that the nuclei formed in burning liquid hydrocarbons with excess oxygen are immediately brought into contact with the make oil, initiating growth of the nuclei.

Another embodiment of the process according to the invention uses natural gas as the fuel. Generation of nuclei is achieved by having the flow velocity of the gas out of the burner lance or lances so slow that mixing of the natural gas into the hot stream of combustion air is poor. Formation of carbon black nuclei in poorly mixed flames is known, and one speaks of luminous flames because the particles which are formed glow. It is important in this procedure, as in the burning of liquid hydrocarbons, that the nuclei generated are brought into contact with the make oil immediately after they are formed. If one allows the nuclei to react with excess oxygen in the combustion zone by using a larger combustion chamber or combustion zone, i.e., if one allows complete combustion in the combustion zone of the reactor, there is no nucleated carbon black formation.

The two embodiments described can also be combined advantageously. In this case, the liquid hydrocarbons and natural gas or other gaseous fuel in suitable proportions are introduced simultaneously into the combustion zone. Oils, such as make oil itself, are used preferably as the liquid hydrocarbons.

Therefore the process according to the invention comprises use of liquid and/or gaseous hydrocarbons as fuel in the combustion zone, in which oxygen is in excess in relation to the hydrocarbons used, providing that carbon nuclei form, for instance, due to insufficient residence time of the liquid hydrocarbons or insufficient mixing of the gaseous hydrocarbons with the combustion air, bringing the carbon nuclei, immediately after their formation, into contact with the carbon black raw material, which is in excess in relation to the oxygen, in the reaction zone, chilling the resulting reaction gas mixture in the quenching zone by spraying in water, and further processing the resulting carbon black in the usual manner.

Thus the process of the invention involves a process for producing carbon black in a carbon black reactor having along the reactor axis a combustion zone, a reaction zone, and a quenching zone, by generating a stream of hot exhaust gas with carbon black nuclei in the combustion zone by partly burning a fuel oil in oxygen-containing gas and leading the exhaust gas from the combustion zone through the reaction zone into the quenching zone, mixing the carbon black make oil into the hot reaction gas in the reaction zone, and halting the carbon black formation in the quenching zone by spraying in water. The process according to the invention is characterized by the fact that liquid oil, an oil/natural gas mixture, or natural gas alone is used as the fuel and the combustion of the fuel is conducted so as to form carbon nuclei and to bring the carbon black raw material immediately into contact with these carbon nuclei.

It is preferred to use as the fuel oil heavy liquid hydrocarbons, that is highly aromatic and/or long-chained hydrocarbons. It is especially preferred to employ as the fuel oil so-called carbon black make oils. Make oils are used in conventional processes as carbon black raw material only and are therefore introduced only into the reaction zone. The process of this invention prefers the use of make oils not only as carbon black raw material but also as fuel oil in the combustion zone. Due to their highly aromatic nature make oils do not burn so readily as conventional fuel oils and therefore make it easier to generate carbon nuclei in the combustion zone as needed for the production of the carbon blacks of the present invention.

The process described is not limited to a particular reactor geometry. Rather, it can be adapted to various reactor types and sizes. One skilled in the art can adjust the desired nuclei formation in the combustion zone through various measures. Variables which can influence optimization of the nuclei formation using oil as fuel include the mass ratio of combustion air/oil, the kind of atomizer used for the fuel, and the sizes and size distribution of the atomized oil droplets. The fuel atomizers can be either pure pressure atomizers (single-fluid atomizers) or two-fluid atomizers with internal or external mixing. The atomizing medium preferentially is compressed air, steam, but can also be an inert gas, hydrogen or even a hydrocarbon gas. The combination of a liquid and a gaseous fuel described above can, therefore, be accomplished, for example, by using the gaseous hydrocarbon as the atomizing medium for the liquid hydrocarbon.

Two-fluid atomizers are used preferably to atomize liquid fuel. While changing the throughput of a single-fluid atomizer changes the droplet size, the droplet size from two-fluid atomizers can be kept largely independent of the throughput.

The size of the atomized droplets must be adjusted so that there are still enough carbon nuclei at the site of injection of the make oil. The optimal droplet size depends on the geometry of the reactor selected. Average droplet diameters in the range of 50 to 100 µm have proved suitable for the reactor used in the examples. These values were determined by atomizing water. The optimal adjustment of the atomizer is best done empirically at the reactor, though, while observing the flame structure. Excessively fine atomizing of the droplets causes complete combustion of the droplets without formation of nuclei. Excessively large droplets form coke and give an unstable flame. Good nuclei formation occurs with a slightly sooty flame.

The carbon black raw materials which are introduced into the reaction zone can be the "make oils" alone or in combination with gases containing hydrocarbons, especially natural gas. Suitable make oils include petrochemical oils (steam cracker oils, cat cracker oils), carbochemical oils (coal tar oils) and pyrolysis oils with a BMC (Bureau of Mines Correlation) index greater than 130.0; see Kirk-Othmer's *Encyclopedia of Chemical Technology,* (Third Edition), Volume 4, page 325 and volume 17, pages 183–271 (these excerpts are entirely incorporated herein by reference). Like the liquid fuels, these oils are preferably sprayed with two-fluid atomizers.

Similar to the conventional carbon black process, the process according to the invention is very flexible with regard to variations of specific surface area and structure of the produced carbon black. The measures required for this process,, such as the adjustment of reaction temperature and the residence time in the reaction zone and the supply of additives to influence the carbon black structure are known to those skilled in the art. It was surprisingly found that the carbon blacks produced by the process according to the invention differ significantly from conventional carbon blacks with the same analytical data. When incorporated into SSBR (solution-polymerized styrene-butadiene)/BR (polybutadiene) rubber compositions these carbon blacks give the resulting rubber composition a tan $\Delta_0$/tan $\delta_{60}$ ratio that is greater than for conventional carbon blacks, while at the same time the tan $\delta_{60}$ value is below the corresponding value for ASTM carbon blacks with the same CTAB surface and 24M4 DBP numbers. This observation applies to carbon blacks with CTAB values between 20 and 190 $m^2$/g, especially for carbon blacks with CTAB values between 80 and 140 $m^2$/g, and 24M4 DBP absorption numbers between 40 and 140 ml/100 g, especially 60 and 140 ml/100 g.

For a discussion of rubber compounding, see Kirk-Othmer's *Encyclopedia of Chemical Technology,* (Third Edition), Volume 20, pages 365–468; this excerpt is entirely incorporated herein by reference.

Figure 2:
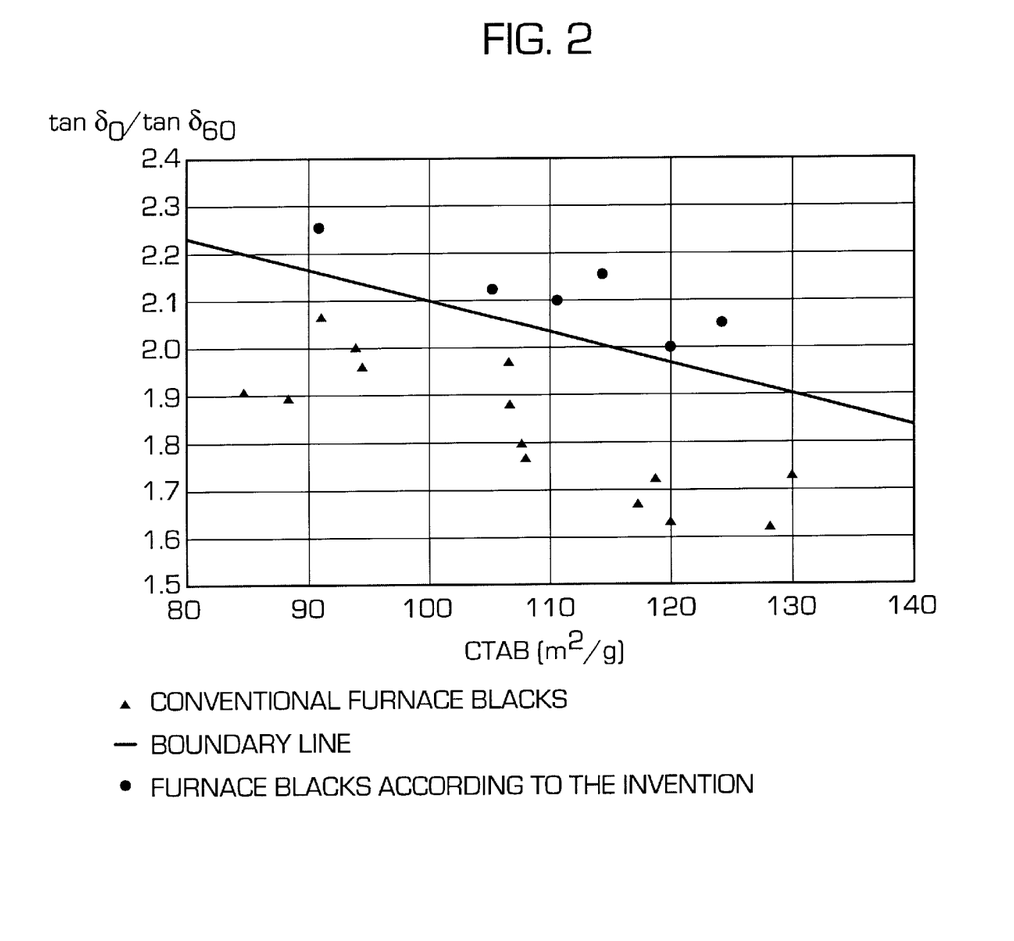
FIG. 2 is a diagram of the ratio tan $\delta_0$/tan $\delta_{60}$ versus the CTAB surface for various carbon blacks produced according to the present invention and comparative conventional carbon blacks.

Detailed investigations have shown that if the ratio of tangents is plotted vs. the CTAB surface, the carbon blacks produced according to the invention are above a boundary line defined by the equation:

$$\tan \delta_0/\tan \delta_{60} = 2.76 - 6.7 \times 10^{-3} \times \text{CTAB}$$

All conventional carbon blacks fall below this line. This is shown in FIG. 2.

One of the objects of the present invention is to reduce the rolling resistance while at the same time retaining good wet grip or skid resistance. A low rolling resistance is related to tan $\delta_{60}$, which is 0.4 or less according to the invention. Preferably, tan $\delta_{60}$ has a value of 0.3 or less, and more preferably 0.263 or less as can be seen from Table 5, supra.

The carbon blacks according to the invention give the SSBR/BR rubber mixtures a stronger temperature dependence of tan δ. Their dynamic modulus of extension, $|E^*|$ at 0° C. is in general lower than that of the comparison carbon blacks.

The nucleated carbon black formation affects the microstructure of the carbon particle surface. Investigations using atomic force microscopy (AFM) have found that the carbon blacks according to the present invention have a rougher surface than the known carbon blacks.

The invention will now be explained in more detail by means of the following illustrative examples:

Examples 1 to 6

Figure 1:
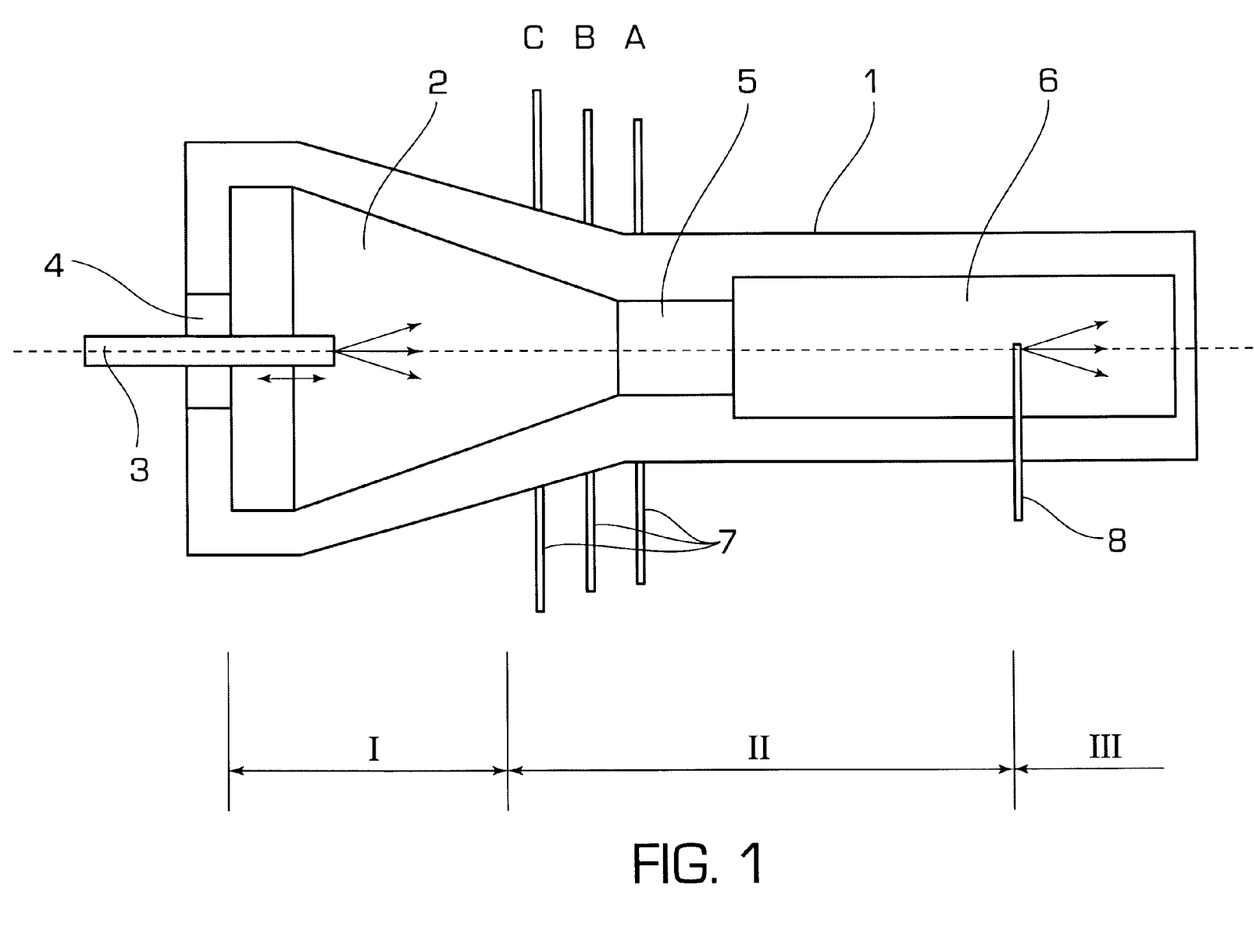
FIG. 1 shows a longitudinal section through the reactor used to produce the carbon black according to the present invention.

A series of carbon blacks was produced according to the invention in the carbon black reactor 1 shown in FIG. 1. It has a combustion chamber 2 in which the hot exhaust gas for pyrolysis of the make oil is generated by burning oil with excess oxygen from the air. The fuel is introduced into the combustion chamber through the axial burner lance 3. The burner lance can be shifted axially to optimize the nucleated carbon black formation. The burner in the reactor was capable of burning oil or gas either alone or in combination.

Combustion air is supplied through the opening 4 in the face of the combustion chamber. The combustion chamber is conical up to the constriction 5. After passing the constriction, the reaction gas mixture expands into the reaction chamber 6.

A, B and C indicate different positions for injection of the make oil into the hot process gas using the oil lances 7. The oil lances have suitable spray nozzles at their heads. At each injection position there are 4 injectors distributed around the circumference of the reactor.

The combustion zone, reaction zone and quenching zone, which are important for the process according to the invention, are indicated in FIG. 1 by the Roman numbers I to III. They cannot be separated sharply from each other. Their axial extent depends on the specific positioning of the burner lance, the oil lances and the quenching water lance 8.

The dimensions of the reactor used were as follows:

Maximum diameter of the combustion chamber: 900 mm

Length of the combustion chamber up to the constriction: 1390 mm

Length of the conical portion of the combustion chamber: 1160 mm

Diameter of the constriction: 140 mm

Length of the constriction: 230 mm

Diameter of the reaction chamber: 250 mm

Positions of the oil lance(s)[1]:

A: 110 mm

B: −150 mm

C: −320 mm

Position of the quenching water lance(s)[1]: approx. 1000–5500 mm

[1] Measured from the entrance of the constriction (+: behind the entrance; −: ahead of the entrance)

All carbon blacks produced in the reactor described were pelletized wet by the usual process before characterization and incorporation into the rubber compositions.

A make oil with a BMC index of 160 was used as the fuel and the make oil to produce the carbon blacks according to the invention. It had the properties show in Table 1:

TABLE 1

Properties of the make oil

| Property | Content |
|---|---|
| Carbon content (% by weight) | 93.4 |
| Hydrogen content (% by weight) | 5.9 |
| Sulfur content (% by weight) | 0.6 |
| Volume of distillate up to 275° C. (% by volume) | 7.5 |
| Volume of distillate up to 300° C. (% by volume) | 17.2 |
| Volume of distillate up to 400° C. (% by volume) | 83.9 |
| Distillable components (% by volume) | 97.9 |

Table 2 shows the reactor parameters for producing the 6 carbon blacks according to the invention. While only make oil was used as the carbon black raw material in examples 1 to 5, a combination of make oil and natural gas was used in Example 6, in which the make oil was atomized with the natural gas.

TABLE 2

Reactor parameters for production of the carbon blacks according to the invention.

| Reactor parameters Parameter | Units | Examples | | | | | |
|---|---|---|---|---|---|---|---|
| | | 1 | 2 | 3 | 4 | 5 | 6 |
| Combustion Air | Nm³/hr | 2400 | 2400 | 2500 | 2500 | 2500 | 2400 |
| Temperature of the combustion air | ° C. | 500 | 500 | 500 | 500 | 500 | 500 |
| Fuel (make oil) | liters/hr | 200 | 200 | 200 | 200 | 200 | 200 |
| Position of the burner lance[1] | mm | −1100 | −1100 | −1300 | −1300 | −1300 | −1300 |
| Make oil | liters/hr | 570 | 700 | 590 | 620 | 630 | 700 |
| Make oil temperature | ° C. | 100 | 120 | 110 | 118 | 115 | 120 |
| Position of the make oil injectors | | 4 × A | 4 × A | 4 × A | 4 × A | 4 × A | 4 × A |
| Additive (K₂CO₃ solution) | 1/hr × gl | 15 × 1 | 10 × 1 | 15 × 1 | 5 × 1 | 16.2 × 1 | 5 × 1 |
| Quench position | mm | 1095 | 1355 | 1095 | 1095 | 1095 | 1960 |
| Temperature at the exit from the reactor | ° C. | 750 | 750 | 750 | 750 | 750 | 750 |

[1] Measured from the entrance to the constriction

Determination of the analytical values of carbon blacks

The usual analytical values were determined for the carbon blacks produced according to the invention as well as for some commercial carbon blacks for comparison. The following standard methods were used:

CTAB surface: ASTM D-3765

Iodine adsorption: ASTM D-1510

DBP absorption: ASTM D-2414

24M4 DBP absorption: ASTM D-3493

Tinting strength: DIN 55979

Determination of the viscoelastic properties

The viscoelastic properties of rubber composition reinforced with these carbon blacks were determined according to the DIN 53513. Specifically, the loss factors, tan $\delta_0$, were measured at 0° C. and 60° C., and the dynamic modulus of extension, $|E^*|$ at 0° C. The test formulation used for the rubber compositions is shown in Table 3.

The $N_2SA$ values of the carbon blacks of examples 1 to 5 (B1 to B5) are given in the following tables.

| Carbon Black | $N_2SA$ (m²/g) |
| --- | --- |
| B1 | 111.7 |
| B2 | 115.3 |
| B3 | 105.0 |
| B4 | 126.4 |
| B5 | 130.2 |
| B6 | 90–95 |

The $N_2SA$ value of B6 was not measured but should lie between 90 and 95 m²/g.

TABLE 3

| SSBR/BR test formulation | |
| --- | --- |
| Rubber component | Content (phr) |
| SSBR | 96.0 |
| BR | 30.0 |
| Carbon Black | 80.0 |
| ZnO RS | 3.0 |
| Stearic acid | 2.0 |
| Aromatic oil | 10.0 |
| 6 PPD | 1.5 |
| Wax | 1.0 |
| CBS | 1.5 |
| Sulfur | 1.5 |

The SSBR rubber component is a solution-polymerized SBR copolymer containing 25% by weight styrene and 75% by weight butadiene. In the butadiene, the linkages are 73% by weight 1.2; 10% by weight cis-1,4; and 17% by weight trans-1,4. The copolymer contains 37.5 phr oil and is sold by Bayer AG under the tradename Buna VSL 1955 S 25. Its Mooney viscosity (ML 1+4/100° C.) is about 50.

The BR rubber component is a cis-1,4-polybutadiene (Titantype) with a cis-1,4 content of 92% by weight; a trans-1,4 content of 4% by weight; and a 1,2-content of 4% by weight. It has a Mooney viscosity between 44 and 50. This component is sold by Bayer AG under the tradename Buna CB 11 S.

Naftolen ZD from Chemetall was used as the aromatic oil. The PPD portion of the test formulation was Vulkanox 4020, and the CBS portion was Vulkacite CZ, both from Bayer AG. Protector G35 from the H B Fuller GmbH was used as the wax.

The carbon black was incorporated into the rubber mixture in three steps as shown in the following tables.

| Step 1 | |
| --- | --- |
| Settings | |
| Mixing system | Werner & Pfleiderer GK 1.5N |
| Friction | 1:1.11 |
| Speed of rotation | 70 min⁻¹ |
| Molding pressure | 5.5 bar |
| Empty volume | 1.6 liters |
| Degree of Filling | 0.7 |
| Flow temperature | 80° C. |
| Mixing process | |
| 0 to 1 minute | Buna VSL 1955 S25 + Buna CB 11S |
| 1 to 2 minutes | ½ carbon black + ZnO RS + stearic acid + Naftolen ZD |
| 2 to 3 minutes | ½ carbon black + Vulcanox 4020 + protector G35 |
| 3 minutes | Clean |
| 3 to 3.5 minutes | Mix and pour out |
| Batch temperature | 140–160° C. |
| Holding | 24 hours at room temperature |

| Step 2 | |
| --- | --- |
| Settings | |
| Mixing system | As in Step 1 up to 0.68 |
| Degree of Filling | 0.68 |
| Mixing procedure | |
| 0 to 2 minutes | Break up batch from Step 1 |
| 2 minutes | Pour out |
| Batch temperature | <150° C. |
| Holding | None |

| Step 3 | |
| --- | --- |
| Settings | |
| Mixing system | As in Step 1 up to 0.65 |
| Degree of Filling | |
| Mixing process | |
| 0 to 1.5 minutes | Batch from Step 2 + Vulkacit CZ + sulphur. Pour out and make a rough sheet on the laboratory roll mixer (diameter 200 mm, length 450 mm, flow temperature 50° C.) |
| 1.5 minutes | Then, to homogenize: Cut left 3 times and right 3 times and fold, and run through 8 times with a narrow roll gap (1 mm) and 3 times with a wide roll gap (3.5 mm) and the draw out the sheet. |

Then the viscoelastic properties were determined with five replicates of the rubber compositions above, under the conditions given in Table 4.

TABLE 4

Determination of the viscoelastic properties according
to DIN 53513
Vulcanization of the samples

| | |
|---|---|
| Vulcanization temperature | 165° C. |
| Vulcanization time | T$_{95}$ + 3 minutes (T$_{95}$: DIN 53529) |
| Sample shape | |
| Shape | Cylindrical |
| Length | 10 mm |
| Diameter | 10 mm |
| Number | 5 |
| Testing machine | |
| Type/Manufacturer | 830/MTS |
| Type of stress | Elongation |
| Mean force amplitude | 50 N |
| Dynamic force amplitude | ± 25N |
| Test frequency | 16 Hz |
| Course of testing | Tempering for 5 minutes; then dynamic stressing at 16 Hz for a period of 2 minutes with subsequent measurement |

The mean value of the measurements from the five samples was used in each case. DIN 53513 is incorporated herein by reference.

Figure 3:
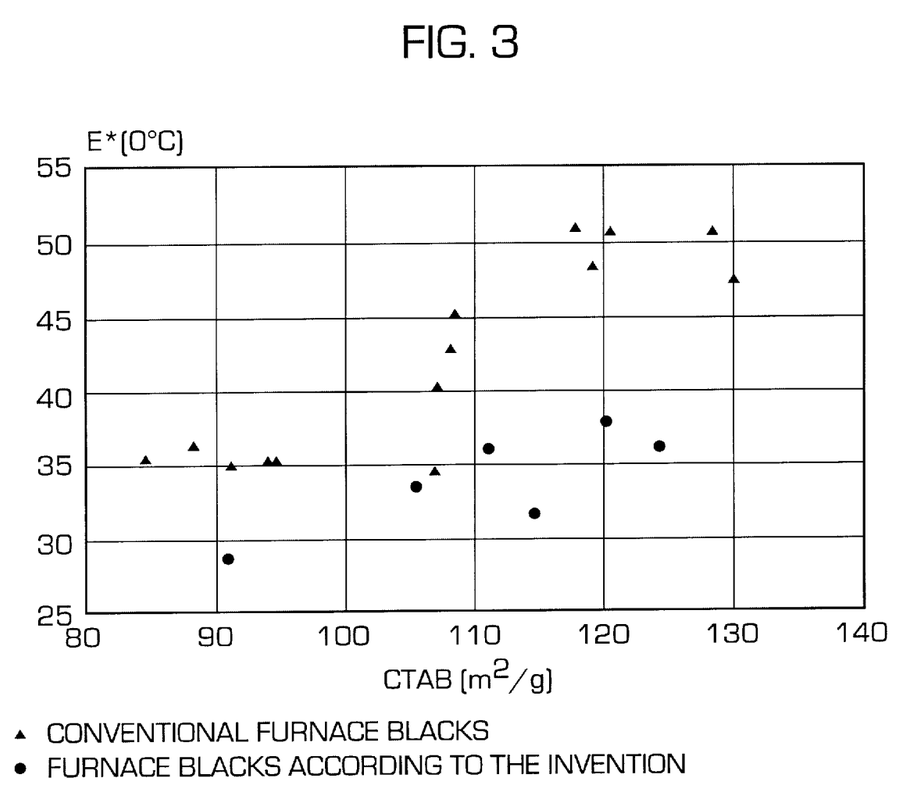
FIG. 3 shows the dynamic modulus of extension $|E^*|$ at 0° C. for the same carbon blacks as in FIG. 2.

The results of the viscoelastic investigations are listed in Table 5 and shown graphically in FIGS. 2 and 3. The investigations included 14 comparative commercial carbon blacks, shown as VI to V14 in Table 5, and 6 carbon blacks according to the present invention, from Examples 1 to 6, shown in table 5 as B1 to B6. The conventional carbon blacks of comparison examples V1 to V14 correspond to the conventional carbon blacks identified in FIGS. 2 and 3.

Table 5 includes the ASTM classifications of the comparison carbon blacks, to the extent that they are known.

The carbon blacks are listed in Table 5 in order of increasing CTAB surface. FIG. 2 shows a plot of the characteristic ratio tan $\delta_0$/tan $\delta_{60}$ versus the CTAB surface for these carbon blacks. The blacks according to the present invention show a surprisingly distinctly higher tangent ratio at the same CTAB surface, and therefore have a steeper temperature curve for the loss factor. This also applies particularly in comparison with the 2 low-hysteresis carbon blacks (V3 and V4) in Table 5, which were carbon blacks according to EP 0 315 442. No steeper temperature curve for the loss factor could be detected with the low-hysteresis carbon blacks.

The range of the carbon blacks according to the present invention can be differentiated clearly from the conventional blacks. It is above the limiting line plotted in FIG. 2, which is given by the equation:

$$\tan \delta_0/\tan \delta_{60} = 2.76 - (6.7 \times 10^{-3} \times \text{CTAB}).$$

It is also characteristic of the blacks according to the present invention that rubber compositions made with them surprisingly have, for the same CTAB surface and similar 24M4 DBP absorption as the comparison backs, a lower loss factor, tan $\delta_{60}$, and in general a lower dynamic modulus of extension.

TABLE 5

| Comparison blocks | | CTAB (m²/g) | Iodine absorption number (mg/g) | DBP (ml/ 100 g) | 24m4 DBP (ml/100 g) | tan $\delta_0$ | tan $\delta_{60}$ | $\delta_0$/tan $\delta_{60}$ | \|E°\| 0° C. MPa |
|---|---|---|---|---|---|---|---|---|---|
| No. | ASTM No. | | | | | | | | |
| V1 | N347 | 84.7 | 89.3 | 121.2 | 98.2 | 0.526 | 0.276 | 1.906 | 35.5 |
| V2 | N347 | 88.3 | 89.2 | 121.2 | 99.8 | 0.511 | 0.270 | 1.893 | 26.4 |
| V3 | 1H-Black | 91.1 | 79.9 | 133.1 | 101.1 | 0.516 | 0.250 | 2.064 | 35.0 |
| V4 | N375 | 94.0 | 89.1 | 111.2 | 98.8 | 0.526 | 0.263 | 2.000 | 35.3 |
| V5 | N375 | 94.6 | 90.8 | 115.2 | 97.0 | 0.533 | 0.272 | 1.960 | 35.2 |
| V6 | 1h-black | 106.8 | 92.9 | 136.7 | 106.9 | 0.504 | 0.256 | 1.969 | 34.5 |
| V7 | N220 | 106.9 | 118.9 | 114.2 | 97.1 | 0.533 | 0.284 | 1.877 | 40.4 |
| V8 | N220 | 107.9 | 120.9 | 114.3 | 98.7 | 0.522 | 0.291 | 1.794 | 42.7 |
| V9 | N220 | 108.2 | 119.6 | 114.1 | 98.1 | 0.522 | 0.296 | 1.764 | 45.4 |
| V10 | N234 | 117.5 | 120.3 | 123.3 | 100.9 | 0.492 | 0.295 | 1.668 | 50.9 |
| V11 | N234 | 119.0 | 123.1 | 122.2 | 101.4 | 0.509 | 0.296 | 1.720 | 48.3 |
| V12 | N234 | 120.4 | 119.0 | 123.6 | 109.8 | 0.489 | 0.300 | 1.630 | 50.7 |
| V13 | N115 | 128.4 | 157.6 | 113.5 | 97.5 | 0.511 | 0.315 | 1.622 | 50.7 |
| V14 | N114 | 130.1 | 158.2 | 108.4 | 97.2 | 0.518 | 0.300 | 1.727 | 47.4 |
| Example blacks | | | | | | | | | |
| B6 | | 90.9 | 98.1 | 111.1 | 102.0 | 0.521 | 0.231 | 2.255 | 28.6 |
| B1 | | 105.4 | 91.5 | 114.5 | 98.1 | 0.517 | 0.244 | 2.119 | 33.4 |
| B2 | | 110.9 | 116.8 | 113.5 | 99.2 | 0.524 | 0.250 | 2.096 | 35.9 |
| B3 | | 114.5 | 112.6 | 107.8 | 93.8 | 0.523 | 0.243 | 2.152 | 31.5 |
| B4 | | 120.2 | 124.1 | 112.4 | 97.2 | 0.527 | 0.263 | 2.004 | 37.7 |
| B5 | | 124.4 | 131.3 | 103.7 | 92.8 | 0.539 | 0.263 | 2.049 | 36.0 |

Kikuchi's carbon blacks identified as CB-2 and CB-3 differ from conventional ASTM-blacks in that no ASTM-black from ASTM D-1765 can be found which matches with CB-2 and CB-3 with respect to CTAB-value, C-DBP-value and particle diameter within the measuring tolerances. Especially, the particle diameters of Kikuchi's blacks are lower than the particle diameters of ASTM-blacks for a given CTAB-value. This is shown in FIG. 1 in Kikuchi.

To the contrary, for the carbon blacks claimed in the present application ASTM-blacks can be found which matches them with respect to CTAB-value, C-DBP-value and particle diameter. But this does not mean that the invention blacks are identical in each and every respect to conventional ASTM-blacks. The invention blacks differ from well known ASTM-blacks by imparting to rubber compositions a higher value for the ratio tan $\delta_0$/tan $\delta_{60}$.

For each ASTM black within the claimed CTAD and C-DBP regions it is possible to produce a corresponding carbon black according to the invention. These new carbon blacks are called "inversion carbon blacks". The key point of the "inversion blacks" is the fact that their "in-rubber-properties" differ advantageously from those of ASTM blacks.

The reason for these differences can be attributed to the increased surface roughness of the inversion blacks and not to CTAB or C-DBP-values. These differences in surface roughness could be demonstrated directly with the STM-measurements.

Kikuchi normalizes his measurements to the properties of the ASTM-black N339.

Nevertheless, a way has been found to extract from Kikuchi the absolute values for tan $\delta_0$/tan $\delta_{60}$ and thus make them comparable to Applicants' measurement herein.

To be able to do this, one assumption is made: Kikuchi uses the ASTM-black N 339 as a reference. Applicants did not investigate this carbon black. But instead Applicants investigated a very similar ASTM-black, namely N347 (carbon black V2 of table 5). Both ASTM-blacks are very similar. The following table shows their CTAB and C-DBP values in comparison.

|  | CTAB ($m^2$/g) | C-DBP (ml/100 g) |
|---|---|---|
| N339 | 90 | 101 |
| N347 | 88.3 | 99.8 |

Both of these carbon blacks have very similar "in-rubber properties." To demonstrate this a direct comparison between these two blacks (N347 (ASTM) and N339 (ASTM)) was carried out twice in the following rubber formulation:

| Rubber Component | content (phr) |
|---|---|
| E-SBR | 137.5 |
| Carbon Black | 80 |
| ZnO RS | 4 |
| Stearic Acid | 2 |
| IPPD | 1 |
| TMQ | 1 |
| Wax | 2 |
| CBS | 1.3 |
| Sulfur | 1.8 |

The E-SBR rubber component is an emulsion-polymerized SBR copolymer containing 37.5 phr hi-aromatic oil, 25% by weight styrene and 75% by weight butadiene and was sold by the company Hüls under the trade name Buna EM 1712. The IPPD portion was Vulkanox 4010, the TMQ portion was Vulkanox HS, the wax portion was Antilux 654 and the CBS portion was Vulkacit CZ, all from Bayer AG.

The following tan $\delta$ values were measured:

|  | tan $\delta_0$ | tan $\delta_{60}$ | tan $\delta_0$/tan $\delta_{60}$ |
|---|---|---|---|
| 1. N339 | 0.380 | 0.221 | 1.719 |
| 2. N339 | 0.376 | 0.223 | 1.686 |
| 3. N347 | 0.380 | 0.216 | 1.759 |
| 4. N347 | 0.378 | 0.221 | 1.710 |

The above table demonstrates that both carbon blacks lead to measurement values for tan $\delta$ which are identical within the testing error intervals.

The above rubber formulation differs from the rubber formulation used in the preceding examples (examples from table 5). The different rubber formulation leads to tan $\delta_0$ and tan $\delta_{60}$-values which deviate from the corresponding values which would be obtained with the rubber formulation of the preceding examples. In the above table also the ratios tan $\delta_0$/tan $\delta_{60}$ are given. Comparing the ratio tan $\delta_0$/tan $\delta_{60}$ for N347 with the corresponding value for N347 in table 5 shows that in both rubber formulations this carbon black lies below the boundary line as given by the equation in claim 1 (For a CTAB-value of 90 the boundary value according to claim 1 is 2.157.) This demonstrates that the invention is essentially independent from the rubber formulation used.

Since in the above table N347 and N339 have nearly identical tan $\delta$-values it is very reasonable to assume, that the carbon black N339 will have the same tan $\delta$-values as carbon black N347 in the rubber formulation of the examples from table 5, too. Therefore the tan $\delta$-values for N339 will be those measured for N347 as given in table 5:

tan $\delta_0$=0.511
tan $\delta_{60}$=0.270

Now the tan $\delta$-values for the carbon blacks of Kikuchi's tables 1 and 2, in which N339 was used as a reference, can be calculated by multiplying the relative values in these tables with the above values and dividing by 100 (the reference value was arbitrarily set to 100 by Kikuchi). In that way Example 1 from table 2 of Kikuchi gives for tan $\delta_0$ and tan $\delta_{60}$:

| tan $\delta_0$ = 99 * 0.511 / 100 = 0.506 |
|---|
| tan $\delta_{60}$ = 93 * 0.270 / 100 = 0.251 |

The resulting values are those which would be obtained by incorporating the carbon blacks of Kikuchi into a rubber formulation from the examples of table 5. The following table shows these values for the carbon blacks N110, N220, N339 and CB-1 of the comparative examples 1 to 4 from table 1 of Kikuchi and for CB-2 and CB-3 of the examples 1 and 2 from table 2 of Kikuchi:

| Carbon black | CTAB ($m^2$/g) | tan $\delta_0$ | tan $\delta_{60}$ | tan $\delta_0$/tan $\delta_{60}$ |
|---|---|---|---|---|
| N110 | 125 | 0.567 | 0.305 | 1.859 |
| N220 | 110 | 0.562 | 0.200 | 1.873 |
| N339 | 90 | 0.511 | 0.270 | 1.893 |
| CB-1 | 83 | 0.470 | 0.246 | 1.911 |
| CB-2 | 95 | 0.506 | 0.251 | 2.016 |
| CB-3 | 102 | 0.531 | 0.262 | 2.027 |

In table 1 of Kikuchi the last six lines are defective. It is assumed that they ought to be identical to the last three lines in table 2. So, the first line gives the tan $\delta_0$, the second line the tan $\delta_{60}$ and the third line gives the wear resistance.

Figure 4:
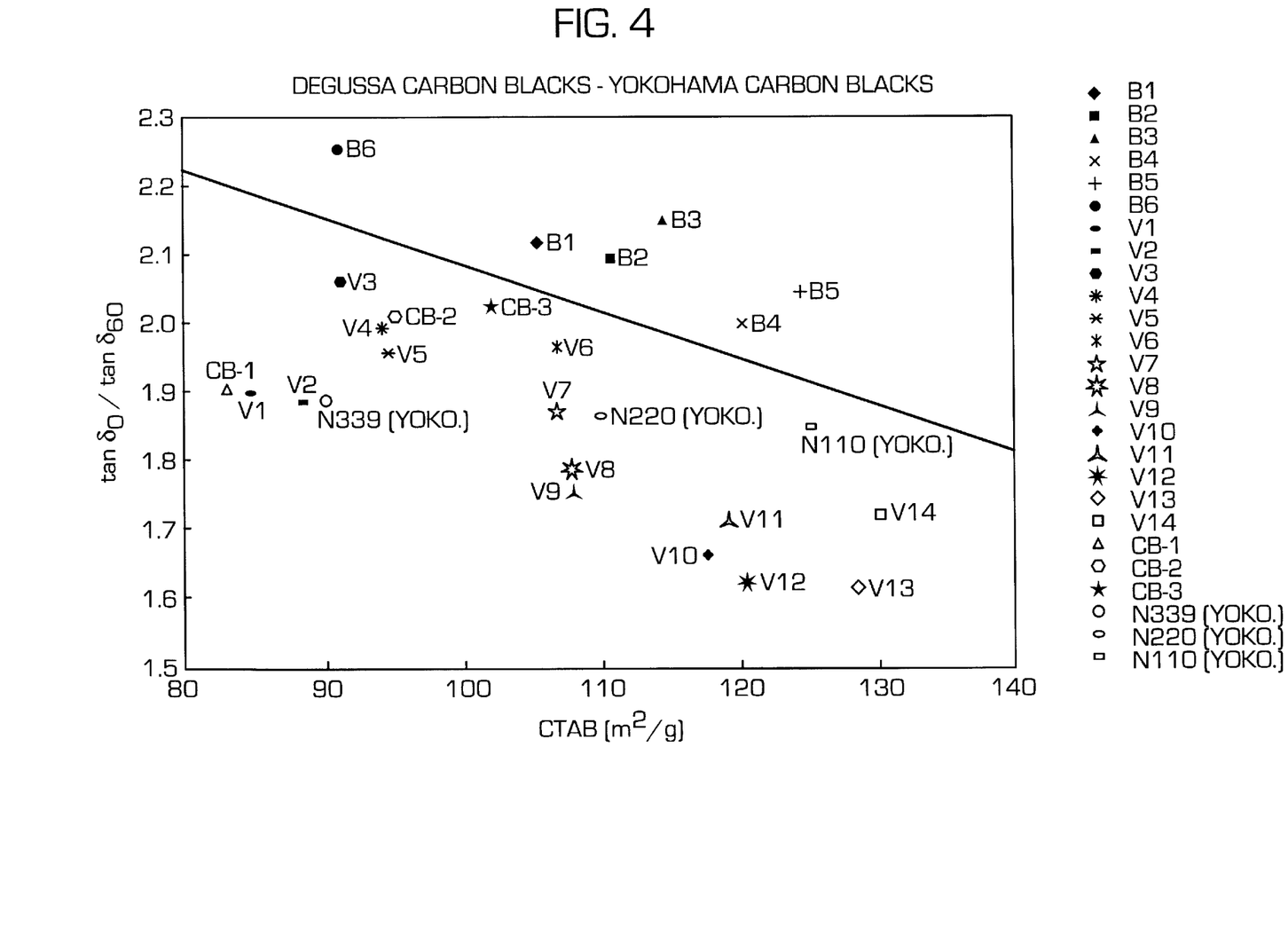
FIG. 4 is a plot of the tan $\delta_0$/tan $\delta_{60}$ versus CTAB for the six examples of the invention and a number of conventional carbon blacks.

The accompanying FIG. 4 corresponds to FIG. 2 of this application. In addition to FIG. 2, Applicants have also plotted the values for the carbon blacks from Kikuchi's patent as given in the above table. It can be seen clearly, that the carbon blacks CB-1, CB-2 and CB-3 from Kikuchi lie below the boundary line and are therefore outside the scope of this invention.

Comparison of Applicants' and Kikuchi's carbon blacks with respect to CTAB value and particle diameter Applicants measured the average particle diameter of Applicants' carbon black B2, B3, and B6 with a transmission electron microscope. The particle diameters given in the table below are the average from 1000 single measurements. Despite this averaging there remains still a measuring uncertainty of 10%. Therefore the primary particle diameters for N220 (ASTM, N220 (Yokohama, Kikuchi) and B2 (inversion black of type N220) can be rated as equal. The CTAB values exhibit measuring tolerances, too. For the range from 80 to 120 $m^2/g$ a measuring error of approximately $\pm 2$ $m^2/g$ can be expected (this is described in ASTM D3765).

In the table below Applicants compare CTAB values and particle sizes dn for various carbon blacks:

| Carbon Black | Source | CTAB [$m^2/g$] | dn [nm] |
| --- | --- | --- | --- |
| N110 | Yoko | 125 | 18.5 |
| N220 | Yoko | 110 | 21.8 |
| N339 | Yoko | 90 | 25.0 |
| CB-1 | Yoko | 83 | 26.0 |
| CB-2 | Yoko | 95 | 22.0 |
| CB-3 | Yoko | 102 | 20.8 |
| B2 | Table 5 | 110.9 | 20.9 |
| B3 | Table 5 | 114.5 | 21.4 |
| B6 | Table 5 | 90.9 | 26.2 |
| N220 | ASTM | 111 | 21.0 |
| N234 | ASTM | 118 | 20.0 |
| N339 | ASTM | 92 | 26.0 |

Yoko: carbon blacks from the Kikuchi patent
ASTM: from the book *Carbon Black Science and Technology Second Edition,* J. B. Donnet, R. C. Bansal and M. Y. Want; Marcel Dekker Inc. 1983

Figure 5:
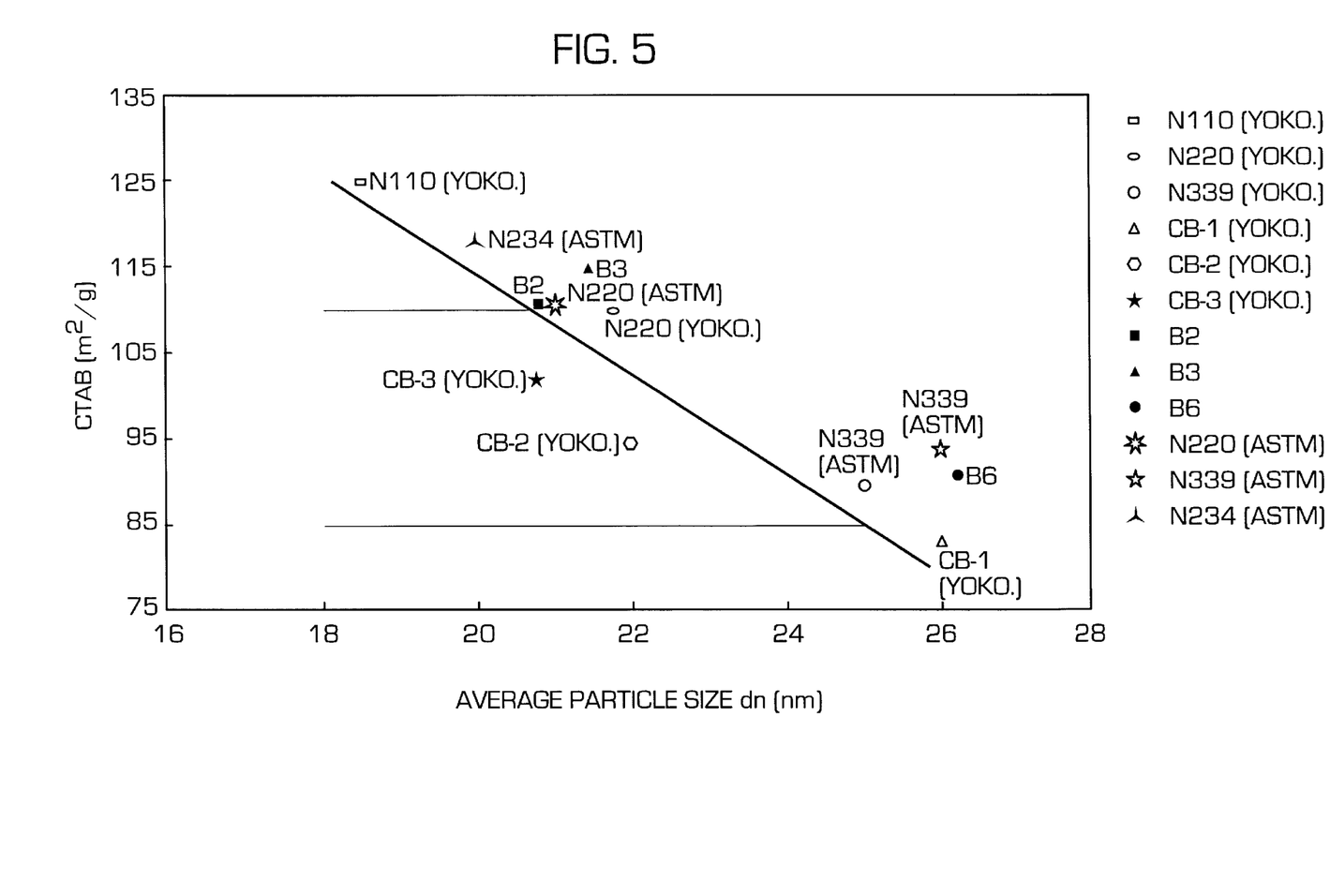
FIG. 5 is a plot of CTAB value versus average particle size for carbon black of the invention and some conventional carbon blacks.

The attached FIG. 5 gives a graphical representation of these values in analogy to FIG. 1 of Kikuchi: It can be seen from this figure that none of Applicants' carbon black and none of the ASTM-blacks fall within the range claimed by Kikuchi. It can also be seen that Applicants' inversion blacks B2, B3 and B6 coincide with respect to their CTAB-values and particle diameters with the corresponding ASTM-blacks.

As already pointed out, the key differences of Applicants' inversion blacks over the ASTM-blacks are their improved "in-rubber" properties. The reason for the improved in-rubber properties is most probably the rough surface of Applicants' inversion blacks.

Figure 6A:
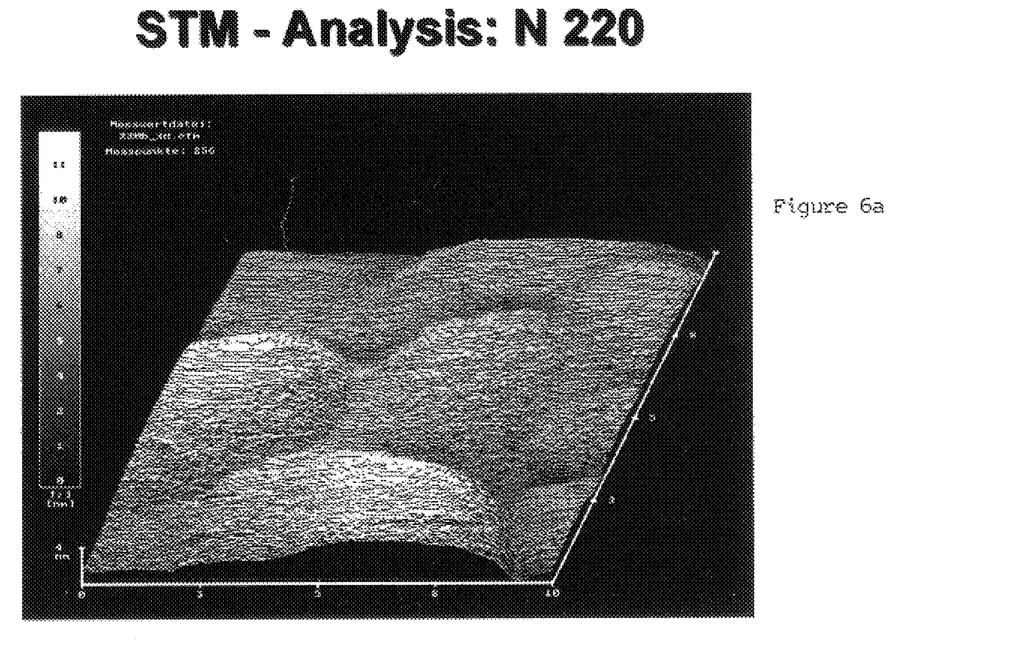
FIG. 6a is a photograph taken with a scanning tunneling microscope (STM) showing the surface texture of a standard carbon black N220 used in comparative example V9 as shown in Table 5.
Figure 6B:
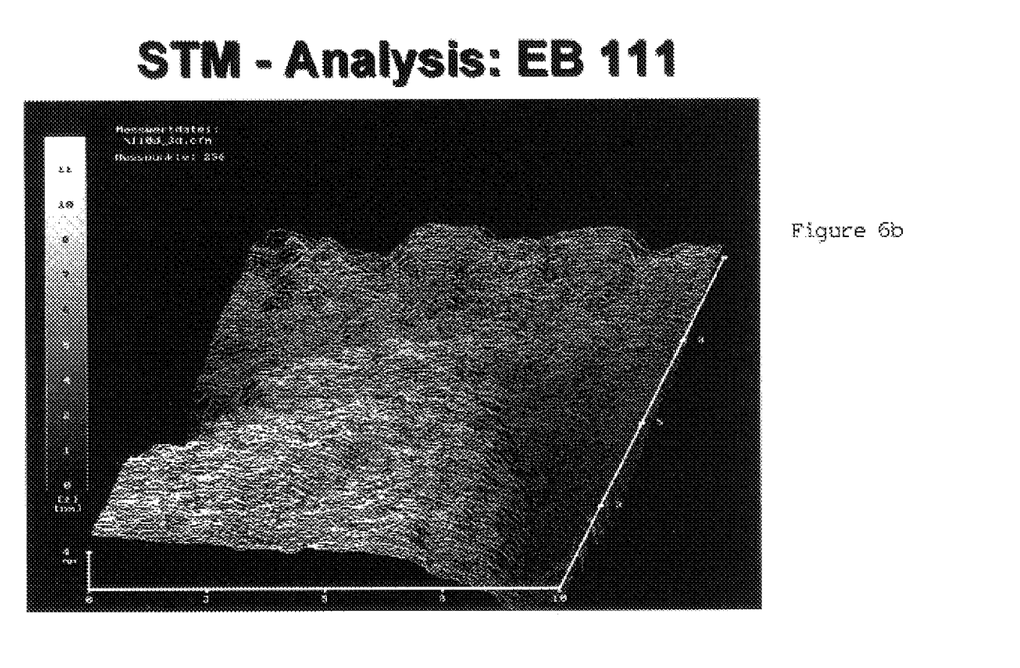
FIG. 6b is a photograph taken with a scanning tunneling microscope (STM) showing the surface texture of a carbon black made in accordance with the procedures in Example B3 (EB111), described below, according to the invention.

Comparison of Applicants' and standard carbon blacks with respect to surface texture FIGS. 6a and 6b are photographs taken with a scanning tunneling microscope (STM) showing the surface texture of a standard carbon black and a carbon black of the invention respectively.

Experiment

Two samples of carbon blacks, namely standard N220 carbon black and the carbon black made in accordance with the procedure in Example B3 (EB111) described above, were suspended in toluene and then placed in an ultrasonic bath to scatter the carbon black agglomerates and to remove pelletizing agents and other contaminants. After this a droplet of the suspension in the size range of about 0.03 ml was placed on a freshly cleaved mica surface. It was then dried for two days. Mica was used as a substratum because of its atomic flat surface to avoid a superposition of two topographical surfaces.

In operation, the STM microscope functions in the following way: an electrode tip is placed over the specimen and lowered onto its surface. When the distance between the electrode tip and the specimen surface is less than about one nanometer, a tunneling current begins to flow between the tip and the specimen which is strongly dependent on the gap between the tip and the surface. Then the electrode tip is scanned across the surface of the specimen. While scanning across the surface, the tunnel current is kept constant by raising and lowering the tip in order to keep the gap between the tip and surface constant. In that way the profile of the surface along the scanline can be registered.

The attached photographs represent the scanlines over a rectangular area of the specimen surface. The scale values given in lateral and vertical directions are quoted in nanometers.

It can be seen from these photographs that the surface of the carbon black produced in accordance with the above-identified application (EB 111) is much rougher than the standard carbon black.

1. Scanning tunneling microscopy investigations by Dr. W. Niedermeier, Universtät Regensburg Scanning tunneling microscopy (STM) allows the investigation of conducting surfaces at resolutions down to the atomic level. A direct three-dimensional representation of the surface is obtained. A very thin tungsten tip is brought in close contact to the surface of the specimen and moved in a raster like manner over the surface. Thereby overlapping of the electron orbitals of the tungsten tip and the surface of the specimen occurs. This leads to a tunnelling current between the tip and the surface. This current is measured and plotted against the lateral displacement of the tip. The results presented below were obtained by scanning the carbon black surfaces over an area of 10 $nm^2$ or 20 $nm^2$, respectively.

FIGS. 6a and 6b are representative for all investigated inversion carbon blacks and standard carbon blacks. The figures demonstrate the striking difference in the microroughness between the inversion carbon black EB111 (corresponding to ASTM N 220) and the standard carbon black N 220.

The interpretation of these pictures is following:

The surface of a primary particle of the carbon black consists in principal of a large number of small graphite-like crystallites. Conventional and inversion carbon blacks are distinguished with respect to the surface roughness which is determined by size and placement of the crystallites.

Figure 7A:
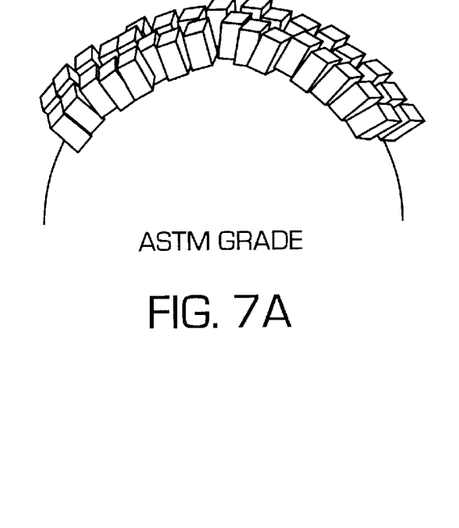
FIG. 7a illustrates the crystallites of conventional ASTM carbon black.
Figure 7B:
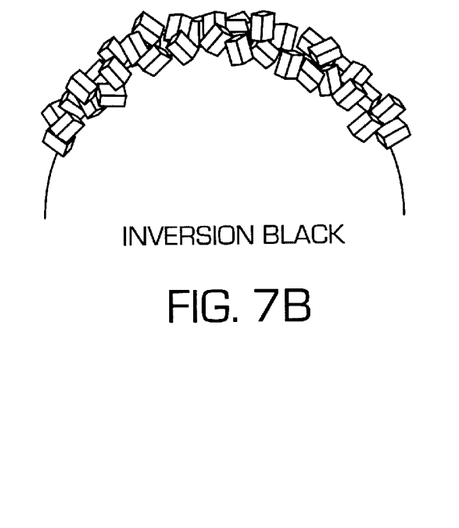
FIG. 7b illustrates crystallites having a turbo static pattern of carbon black according to the invention.

Inversion blacks comprise smaller crystallites in comparison to conventional carbon black N 220. In addition these smaller crystallites are arranged in irregular (turbo static) pattern (see FIGS. 7a and 7b). Both properties lead to a rougher surface of the primary carbon black particles which therefore exhibit a larger number of surface defects at the aromatic basal layers and to an increased specific surface area. The defects form active centers which offer additional points of adhesion between carbon black and rubber polymer. These defects are therefore decisive for the reinforcement of rubber polymers by the carbon black. Three different types of inversion blacks were investigated together with their conventional ASTM counterparts:

| Inversion black | Conventional ASTM black |
| --- | --- |
| EB 111 | N 220 |
| EB 123 | N 115 |
| EB 136 | N 234 |

The scanning tunnelling microscopic investigations were evaluated as to the average lateral dimensions $L_a$ of the graphite-like crystallites and the average step heights between adjacent crystallites. The results are listed in the table below:

|  | EB 111 | N 220 | EB 123 | N 115 | EB 136 | N 234 |
| --- | --- | --- | --- | --- | --- | --- |
| $L_a$ [nm] | 0.5–0.8 | 1.0–1.5 | 0.5–0.9 | 0.9–1.0 | 0.6–1.0 | 1.2–2.0 |
| S [nm] | 0.4–0.7 | 0.2–0.4 | 0.4–0.9 | 0.5–1.0 | 0.3–0.6 | 0.7–1.0 |

The above table shows the following striking difference between our new inversion blacks and the corresponding conventional blacks:
- the lateral dimension $L_a$ of the graphite-like crystallites amounts to 0.5 to 1.0 nm for the inversion blacks and is therefore significantly smaller than the corresponding values of conventional blacks.
- the average step height between adjacent crystallites is for the inversion blacks EB 111 and EB 123 similar or larger than for conventional blacks.

The roughness of the carbon black primary particles is composed of both, the lateral dimension of the crystallites and the step height. It can be concluded that the roughness of all inversion blacks is larger than the roughness of the conventional blacks.

2. NMR Relaxation by Prof. Dr. W. Gronski, University of Freiburg

Nuclear magnetic spin resonance yields precise data about the magnetic moments and also about the arrangement of atoms and molecules with respect to one another.

Transverse $^1$H NMR relaxation was used as a tool for investigating the interaction between rubber polymer and carbon blacks in dependence of carbon black surface roughness. This method is well suited for this investigation since the $^1$H nucleus is extremely sensitive to NMR resonances. The aim of this investigation was to distinguish between the small quantity of rubber polymer absorbed at the carbon black surface (and which therefore has a restricted mobility) and the large majority of polymer matrix.

It could be demonstrated that the transient behavior of the relaxation is coupled to polymer adsorption on the rough carbon black surface.

Based on the work of Sotta et al[1] the relaxation times could be related to the distance between two entanglements or between polymeric units adsorbed on the carbon black surface.

For these measurements SBR (E-SBR 1500) polymer rubber loaded with 50 phr carbon black were extracted in a soxhlet extractor for 4 days with toluene at 112° C. The extracted samples were thoroughly dried under vacuum at room temperature. Afterwards, the remaining polymer rubber on the carbon black surface, known as bound rubber, was investigated with regard to adsorption properties.

Figure 8:
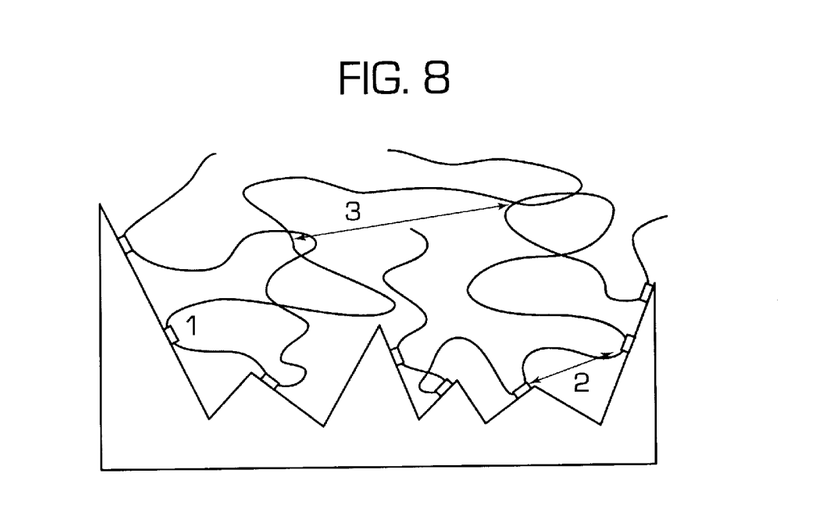
FIG. 8 is an illustration of the three distances between polymeric units adsorbed on a rough carbon black surface.

Three distinct lengths elements could be detected (see FIG. 8) which correspond to three different relaxation times of the rubber bound to the rough carbon black surface. These three relaxation regimes represent weakly bonded Bound Rubber ($R_3$), a polymer component ($R_1$) which is firmly attached to the carbon black surface and a third component ($R_2$) which has an intermediate mobility.

[1] P. Sotta, C. Fülber, D. E. Demco, B. Blümrich and H. W. Spiess, *Macromolecules* 29, 6222 (1996).

In accordance with Sotta the intermediate regime $R_2$ is representative for the roughness of the carbon black surface. The smallest regime $R_1$ has a spatial extent corresponding to the distance between a proton spin pair. The measurements yield for $R_2$ a value of 2 nm which is in conformance with roughness values which were derived from STM measurements.

Table 2 shows the results of the NMR measurements. $f_1$ is the immobilized part, $f_2$ the part with intermediate mobility and $f_3$ the most mobile part of the rubber polymer. The measurements were done at 300K.

TABLE 2

Relaxation times $t_{2,i}$ and polymer parts $f_i$ of the three different parts of bound rubber for SBR rubber formulations with different carbon blacks.

| sample | $T_{2,3}$ [μS] | $T_{2,3}$ [μS] | $T_{2,3}$ [μS] | $f_3$ | $f_2$ | $f_1$ |
| --- | --- | --- | --- | --- | --- | --- |
| N 220 | 184 | 94 | 22 | 0.59 ± 0.01 | 0.19 ± 0.01 | 0.2 ± 0.01 |
| EB 111 | 188 | 108 | 24 | 0.57 ± 0.01 | 0.15 ± 0.01 | 0.27 ± 0.01 |
| N 234 | 200 | 85 | 19 | 0.67 ± 0.01 | 0.17 ± 0.01 | 0.15 ± 0.01 |
| EB 136 | 188 | 83 | 16 | 0.62 ± 0.01 | 0.2 ± 0.01 | 0.16 ± 0.01 |
| N 339 | 191 | 89 | 17 | 0.64 ± 0.01 | 0.17 ± 0.01 | 0.17 ± 0.01 |
| EB 137 | 187 | 109 | 18 | 0.56 ± 0.01 | 0.2 ± 0.01 | 0.22 ± 0.01 |

The part of loosely bounded polymer ($f_3$) is the largest constituent of the polymer. This part is smaller for the inversion blacks EB 111, EB 136 and EB 137 than for the corresponding conventional blacks N 220, N 234 and N 339.

The differences between inversion blacks and conventional blacks lie outside the estimated error intervals and are therefore significant.

The immobilized part of the polymer ($f_1$) is larger for the inversion blacks than for the conventional blacks indicating a higher adsorption strength for the inversion blacks. This observation is in conformance with the theoretical predictions that adsorption is stronger when the surface is rougher.

3. Conclusion

The STM-investigations allow the direct measurement of the surface roughness of carbon blacks which can be described by two parameters, namely the lateral extent of the graphite crystallites and the average step height between adjacent crystallites.

The transverse NMR-relaxation is an indirect method for characterizing carbon black surface roughness (rubber formulations) which allow the estimation of nano scale roughness of carbon black surfaces. Moreover, the disordered nature of the surfaces of these novel carbon black grades is reflected by the relaxation behavior of the bound rubber of extracted compounds. Their enhanced adsorption power is revealed in an increased fraction of rubber that is immobilized on the carbon black surface.

Both characterization methods are independent but yield consistent results with regard to surface roughness.

Further variations and modifications of the foregoing will be apparent to those skilled in the art and such variations and modifications are intended to be encompassed by the claims that are appended hereto.

German priority Application 195 21 565.6, filed on Jun. 19, 1995, is relied on and incorporated by reference. All ASTM and DIN methods referenced herein are incorporated herein by reference.

We claim:

1. A carbon black with a CTAB value between 20 and 190 $m^2/g$ and 24M4 DBP absorption between 40 and 140 ml/100 g, wherein said carbon black when incorporated into a SSBR/BR rubber results in said rubber having a tan $\delta_0$/tan $\delta_{60}$ ratio above a value given by the equation:

$$\tan \delta_0/\tan \delta_{60} = 2.76 - 6.7 \times 10^{-3} \times CTAB.$$

2. A process for producing the carbon black according to claim 1 in a carbon black reactor having a combustion zone, a reaction zone and a quenching zone along the length of the reactor axis, said method comprising generating a stream of hot exhaust gas in said combustion zone by burning a fuel in a gas containing oxygen having a K factor between 0.3 and 0.95 and conducting the resulting hot exhaust gas from said combustion zone through said reaction zone to said quenching zone, mixing carbon black raw material into said hot exhaust gas in said reaction zone, and terminating carbon black formation in said quenching zone by spraying in water, wherein said fuel is oil, and oil/natural gas mixture, or natural gas and said burning of said fuel is conducted so that carbon nuclei form and said carbon black raw material is brought immediately into contact with said carbon nuclei.

3. The process according to claim 2, wherein said K factor is between 0.6 and 0.7.

4. A rubber composition filled with carbon black of claim 1.

5. A tire comprising the rubber composition according to claim 4.

6. An industrial article comprising the rubber composition according to claim 4.

7. A carbon black with a CTAB value between 80 and 180 $m^2/g$ and 24M4 DBP absorption between 80 and 140 ml/100 g, wherein said carbon black when incorporated into a SSBR/BR rubber results in said rubber having a tan $\delta_0$/tan $\delta_{60}$ ratio $> 2.76 - 6.7 \times 10^{-3} \times CTAB$, which has the tan $\delta_{60}$ value below the tan $\delta_{60}$ value for ASTM carbon black having the same CTAB value.

8. A carbon black with a CTAB value between 80 and 180 $m^2/g$ and 24M4 DBP absorption between 80 and 140 ml/100 g, wherein said carbon black when incorporated into a SSBR/BR rubber results in said rubber having a tan $\Delta_0$/tan $\delta_{60}$ ratio $> 2.76 - 6.7 \times 10^{-3} \times CTAB$, wherein the black lies above a boundary line defined by the equation:

$$\tan \delta_0/\tan \delta_{60} \text{ ratio} = 2.76 - 6.7 \times 10^{-3} \times CTAB.$$

9. A rubber composition suitable for the manufacture of automotive vehicle tires comprising an SSBR/BR rubber and a sufficient amount of carbon black according to claim 1.

10. The carbon black defined in claim 1 wherein a surface of particles of said carbon black are rougher than carbon black particles that have a tan $\delta_0$/tan $\delta_{60}$ ratio below said value according to said equation.

11. The carbon black defined in claim 10 said surface of said carbon black particles has a roughness relative to known carbon black particles according to FIGS. 6a and 6b.

12. The carbon black defined in claim 1 wherein average lateral dimensions ($L_a$) of crystallites of said carbon black are from 0.5 to 1.0 nm.

13. The carbon black defined in claim 1 wherein an average step height between adjacent crystallites of said carbon black is similar to or greater than the step height of conventional ASTM carbon black.

14. The carbon black defined in claim 1 wherein a sample of rubber containing said carbon black contains a smaller portion of loosely bounded polymer than a sample of rubber containing a corresponding conventional ASTM carbon black.

15. The carbon black defined in claim 1 wherein a sample of rubber containing said carbon black contains a larger portion of immobilized polymer than a sample of rubber containing a corresponding conventional ASTM carbon black.

16. The carbon black defined in claim 1 wherein tan $\delta_{60}$ is 0.4 or less.

17. The carbon black defined in claim 16 wherein tan $\delta_{60}$ is 0.3 or less.

18. The carbon black defined in claim 17 wherein tan $\delta_{60}$ is 0.263 or less.

19. The carbon black defined in claim 1 wherein tan $\delta$ is measured according to DIN 53513.

* * * * *